United States Patent
Homison et al.

(10) Patent No.: US 10,858,992 B2
(45) Date of Patent: Dec. 8, 2020

(54) TURBOCHARGER SYSTEMS AND METHOD FOR CAPTURING A PROCESS GAS

(71) Applicant: Transportation IP Holdings, LLC, Norwalk, CT (US)

(72) Inventors: Christopher Joseph Homison, Wattsburg, PA (US); Daniel Edward Loringer, Erie, PA (US)

(73) Assignee: TRANSPORTATION IP HOLDINGS, LLC, Norwalk, CT (US)

( * ) Notice: Subject to any disclaimer, the term of this patent is extended or adjusted under 35 U.S.C. 154(b) by 13 days.

(21) Appl. No.: 16/276,177

(22) Filed: Feb. 14, 2019

(65) Prior Publication Data

US 2020/0263603 A1   Aug. 20, 2020

(51) Int. Cl.
| | |
|---|---|
| *F02C 3/36* | (2006.01) |
| *F02B 37/18* | (2006.01) |
| *F02C 3/06* | (2006.01) |
| *F02G 5/02* | (2006.01) |
| *F02C 1/08* | (2006.01) |
| *E21B 43/26* | (2006.01) |
| *E21B 43/16* | (2006.01) |

(52) U.S. Cl.
CPC ............... *F02C 3/36* (2013.01); *F02B 37/18* (2013.01); *F02C 1/08* (2013.01); *F02C 3/06* (2013.01); *F02G 5/02* (2013.01); *E21B 43/164* (2013.01); *E21B 43/26* (2013.01)

(58) Field of Classification Search
CPC ...... F02C 3/36; F02C 1/08; F02C 3/06; F02G 5/02; F02B 37/18; E21B 43/164; E21B 43/26

USPC .............................. 60/650, 682–684
See application file for complete search history.

(56) References Cited

U.S. PATENT DOCUMENTS 3,714,887 A * 2/1973 Johnson ................. A01D 46/00
                                                99/477
4,052,260 A * 10/1977 Forster .................... G21D 5/06
                                                376/394

(Continued)

FOREIGN PATENT DOCUMENTS

| CN | 102644499 A | 8/2012 |
| GB | 2542809 A | 4/2017 |

(Continued)

*Primary Examiner* — Hoang M Nguyen
(74) *Attorney, Agent, or Firm* — McCoy Russell LLP

(57) ABSTRACT

Systems and methods are provided for a turbocharger system for use with a process gas capture system. In one example, the turbocharger system comprises: a heat exchanger positioned to receive inlet gas from a gas generating system via a first inlet; a low pressure compressor driven by a low pressure turbine and coupled to a first outlet of the heat exchanger; a mid-pressure compressor driven by a mid-pressure turbine and coupled in series with the low pressure compressor, the mid-pressure compressor configured to receive low pressure compressed gas from the low pressure compressor; and a high pressure compressor driven by a high pressure turbine and coupled in series with the mid-pressure compressor, the high pressure compressor configured to receive mid-pressure compressed gas from the mid-pressure compressor and output high pressure compressed gas to the process gas capture system and a second inlet of the heat exchanger.

20 Claims, 4 Drawing Sheets

(56) References Cited

U.S. PATENT DOCUMENTS

| | | | | |
|---|---|---|---|---|
| 5,212,942 | A * | 5/1993 | Malohn | F02C 7/10 60/39.17 |
| 5,537,822 | A * | 7/1996 | Shnaid | F02C 6/04 60/650 |
| 5,590,528 | A | 1/1997 | Viteri | |
| 5,867,980 | A | 2/1999 | Bartos | |
| 6,910,335 | B2 | 6/2005 | Viteri et al. | |
| 7,596,947 | B2 * | 10/2009 | Yanai | F02C 1/05 60/644.1 |
| 7,961,835 | B2 | 6/2011 | Keller | |
| 9,249,998 | B2 | 2/2016 | Lemieux et al. | |
| 2012/0000204 | A1 * | 1/2012 | Kesseli | F02C 3/107 60/778 |

FOREIGN PATENT DOCUMENTS

| | | |
|---|---|---|
| WO | 2009125103 A1 | 10/2009 |
| WO | 2013159299 A1 | 10/2013 |
| WO | 2013167726 A2 | 11/2013 |

* cited by examiner

US 10,858,992 B2

TURBOCHARGER SYSTEMS AND METHOD FOR CAPTURING A PROCESS GAS

BACKGROUND

Technical Field

Embodiments of the subject matter disclosed herein relate to turbocharger systems for use with a process gas, such as carbon dioxide, capture system.

Discussion of Art

Hydraulic fracturing, commonly known as hydrofracturing or simply fracturing, is a mining technique used to release trapped hydrocarbons, including petroleum (e.g., oil) and natural gas, or other substances from underground reservoir rock formations by drilling a wellbore into the formation and pumping in a fracturing fluid, thereby fracturing the formation and releasing the trapped substances for extraction. Current fracturing systems utilize a process wherein a slurry of fracturing fluid and proppant (e.g. sand) is created and then pumped into the wellbore at high pressure. When water-based fracturing fluids are used, the proppant, water, and appropriate chemicals can be mixed at atmospheric pressure and then pumped up to a higher pressure for injection into the well. However, if fluids other than water (e.g., liquid carbon dioxide or liquid propane) are used as the fracturing fluid, then these fluids must be kept at a sufficient pressure throughout the fracturing system to avoid undesired vaporization. As a result, the blending of these fluids with proppant, chemicals, etc. must also be accomplished while the fluids are kept under a sufficiently high pressure.

For example, carbon dioxide ($CO_2$) fracturing uses $CO_2$ as the fracturing fluid, replacing all or most of the water used in conventional hydrofracturing. An advantage of using $CO_2$ is increased hydrocarbon production through reduced damage to the formation. Additionally, potential soil contamination due to top-side fluid spills and the use of clean drinking water sources for the fracturing fluid are greatly reduced. However, several factors limit commercial application for $CO_2$ fracturing, including a cost of $CO_2$ and an availability of $CO_2$ at the well site. Further, the $CO_2$ must be injected into the well as a supercritical liquid to be used as the fracturing fluid. Therefore, $CO_2$ fracturing operations may utilize $CO_2$ delivered from an external source that is stored on site and blended with proppant under pressure.

BRIEF DESCRIPTION

In one embodiment, a turbocharger system for use with a mining or other process gas capture system includes a heat exchanger positioned to receive hot inlet gas from a gas generating system via a first inlet; at least one low pressure turbocharger including a low pressure compressor rotationally coupled to a low pressure turbine and fluidly coupled to a first outlet of the heat exchanger, the low pressure compressor configured to receive cooled inlet gas discharged from the first outlet of the heat exchanger; at least one mid-pressure turbocharger including a mid-pressure compressor rotationally coupled to a mid-pressure turbine and fluidly coupled in series with the low pressure compressor, the mid-pressure compressor configured to receive low pressure compressed gas discharged by the low pressure compressor; and at least one high pressure turbocharger including a high pressure compressor rotationally coupled to a high pressure turbine and fluidly coupled in series with the mid-pressure compressor, the high pressure compressor configured to receive mid-pressure compressed gas discharged by the mid-pressure compressor and output high pressure compressed gas to the process gas capture system and a second inlet of the heat exchanger.

DETAILED DESCRIPTION

Figure 1:
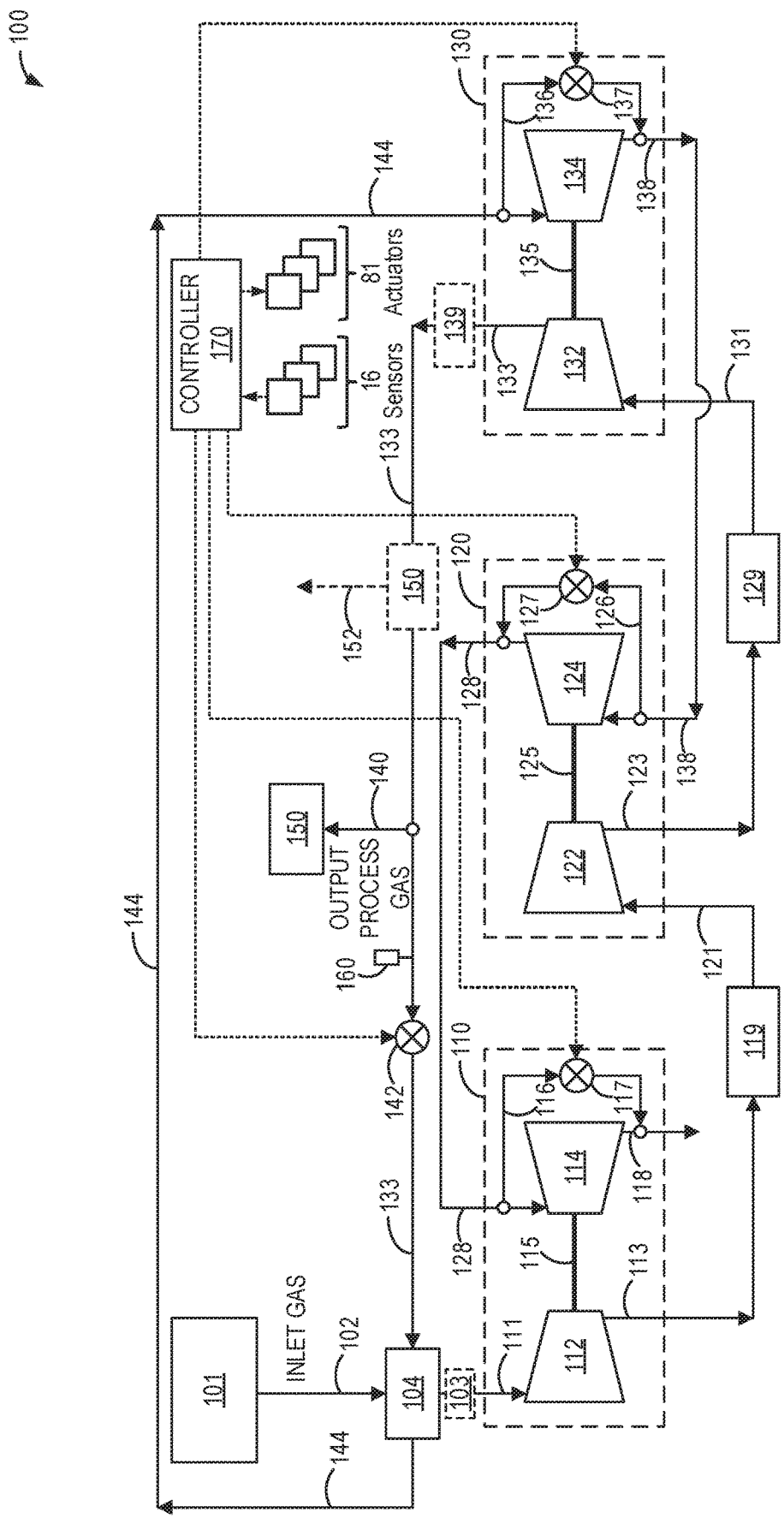
FIG. 1 shows a schematic representation of a Brayton cycle turbocharger system included in a gas separation system, according to an embodiment of the invention.

The following description relates to embodiments of a system for use with a carbon dioxide (or other type of process gas) capture system, including: a heat exchanger positioned to receive hot inlet gas from a gas generating system via a first inlet; at least one low pressure turbocharger including a low pressure compressor rotationally coupled to a low pressure turbine and fluidly coupled to a first outlet of the heat exchanger, the low pressure compressor configured to receive cooled inlet gas discharged from the first outlet of the heat exchanger; at least one mid-pressure turbocharger including a mid-pressure compressor rotationally coupled to a mid-pressure turbine and fluidly coupled in series with the low pressure compressor, the mid-pressure compressor configured to receive low pressure compressed gas discharged by the low pressure compressor; and at least one high pressure turbocharger including a high pressure compressor rotationally coupled to a high pressure turbine and fluidly coupled in series with the mid-pressure compressor, the high pressure compressor configured to receive mid-pressure compressed gas discharged by the mid-pressure compressor and output high pressure compressed gas to the carbon dioxide capture system and a second inlet of the heat exchanger. In one example, the system further includes a choke valve coupled between an outlet of the high pressure compressor and the second inlet of the heat exchanger. As another example, the system further includes one or more turbine bypass valves, each of the one or more a turbine bypass valve coupled across one of the low pressure turbine, the mid-pressure turbine, and the high pressure turbine. As such, the system may comprise a Brayton cycle turbocharger system configured to compress a process gas for capturing $CO_2$, such as at a hydofracturing well site for oil and gas drilling, at a desired process gas flow rate and pressure.

There is a need for an efficient $CO_2$ capture system that provides for optimal recovery of $CO_2$ from a $CO_2$-containing flow stream, such as an exhaust gas stream, that has low equipment costs, low energy consumption for operation, and a small footprint occupied at the well site. Therefore, embodiments of the turbocharger system may include three compressor stages (e.g., the low pressure compressor, the mid-pressure compressor, and the high pressure compressor) coupled in series with intercooling between each stage. As a result, an efficiency of the turbocharger system is increased, and a higher process gas pressure may be achieved (versus including fewer than three compressor stages). Further, due to the higher process gas pressure achieved, a productivity of downstream hardware and processes, such as a membrane separation of $CO_2$ from the process gas, may be increased. Further still, a mechanical stress on each stage may be reduced by lowering a pressure ratio across each compressor, and the equipment may be downsized accordingly to reduce equipment costs and footprint. Additionally, the lower pressure ratio across the compressor also allows for use of compressor hardware with a larger flow range (e.g., map width). Further still, the flow and pressure characteristics of the turbocharger system can be altered by changing the characteristics of the high pressure turbocharger stage only, which is the smallest and lowest cost of the three stages. In this way, the turbocharger system may be operated over a wide operating range in order to handle off-design operating points, ambient conditions, etc.

Traditionally, shifting boundary conditions to the turbocharger system, including ambient conditions and conditions of the upstream gas generating system and the downstream $CO_2$ capture system, affect the pressure and flow rate of the turbocharger system. Therefore, embodiments of the turbocharger system may additionally include one or more valves for adjusting pressure and flow characteristics of the turbocharger system, such as the choke valve, which is positioned between compression and heating sections of the turbocharger system, and the one or more turbine bypass valves. For example, the choke valve may be adjusted to selectively restrict flow from the high pressure compressor to the heat exchanger and downstream to the high pressure turbine, thereby varying a flow rate of the process gas output by the turbocharger system. As another example, the one or more turbine bypass valves may be adjusted to vary a mass flow through the corresponding turbine, thereby varying an amount of work on the corresponding compressor and, as a result, the pressure of the process gas output by the turbocharger system. A target flow rate and pressure of the process gas may be achieved by the turbocharger system across varying boundary conditions through coordinated control of the choke valve and the one or more turbine bypass valves, without modifying the turbine hardware.

FIG. 1 shows an exemplary embodiment of a Brayton cycle turbocharger system for a gas separation system. For example, the Brayton cycle turbocharger system may receive a gas stream from a gas generating system, the gas stream containing $CO_2$ among other gas components, compress the $CO_2$-containing gas, and output the compressed $CO_2$-containing gas to a gas $CO_2$ capture system. The system may include three turbocharger stages coupled in series (a low pressure stage, a mid-pressure stage, and a high pressure stage), each turbocharger including a compressor driven by a turbine, with a choke valve coupled downstream of the compressors and upstream of the turbines. The system may further include a turbine bypass valve coupled across one or more of the turbines. A controller may be configured to adjust the choke valve and the turbine bypass valve(s) based on operating conditions to provide a desired pressure and flow rate of the compressed $CO_2$-containing gas to a gas $CO_2$ capture system, such as according to the method of FIG. 2 and/or according to the example control scheme of FIG. 3.

Figure 4:
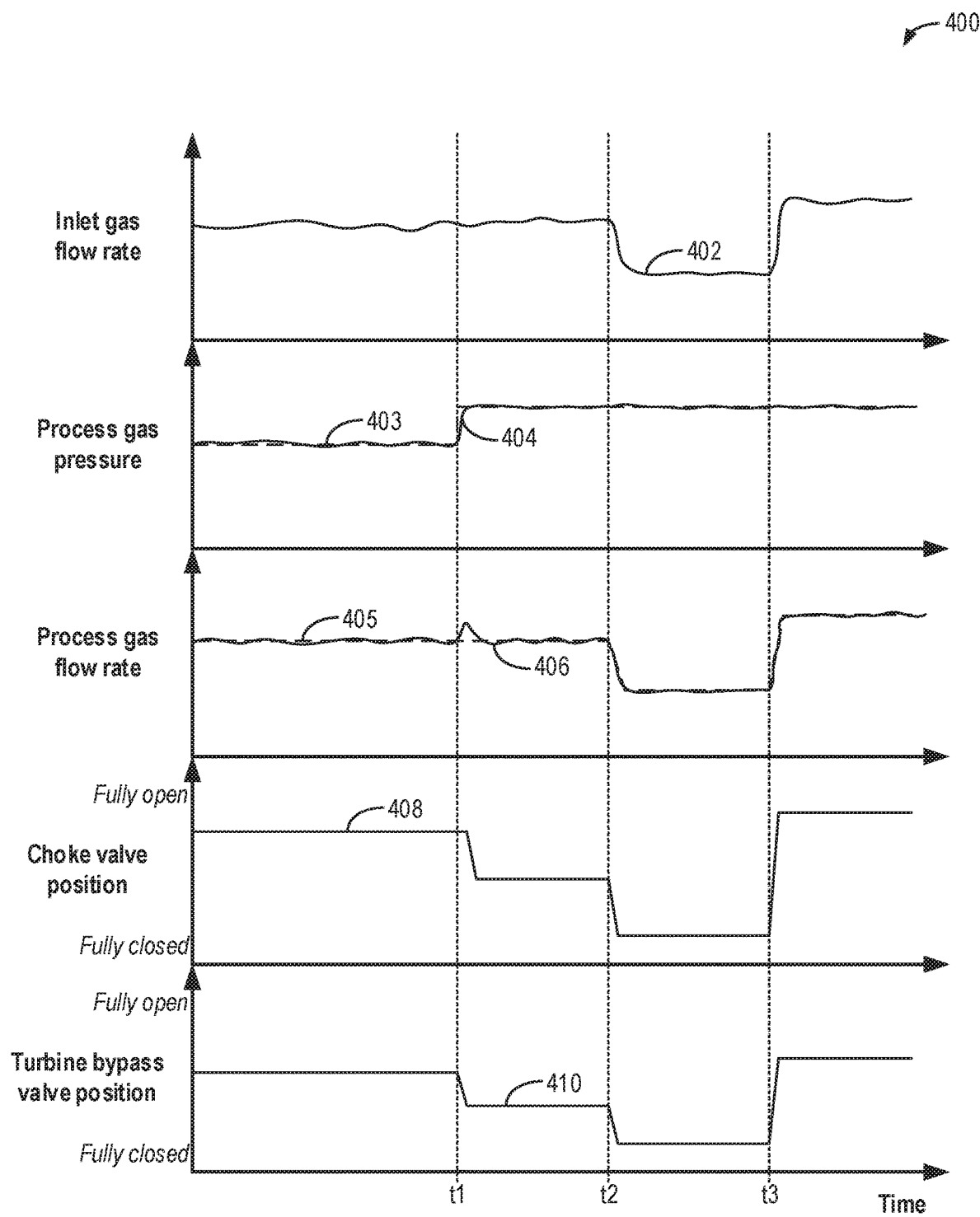
FIG. 4 is an example timeline for adjusting a choke valve and a turbine bypass valve of a Brayton cycle turbocharger system to produce a desired pressure and flow rate of process gas as operating conditions change, according to an embodiment of the invention.

FIG. 4 shows a prophetic example timeline for adjusting the choke valve and one of the turbine bypass valve(s) responsive to changing operating conditions.

Referring to FIG. 1, a schematic depiction of an exemplary Brayton cycle turbocharger system 100 is shown. In the depicted embodiment, the turbocharger system is coupled to a gas generating system 101 and a $CO_2$ capture system 150. For example, the gas generating system may be a diesel or gas engine. As such, the turbocharger system may be included in a gas separation system for capturing and sequestering $CO_2$. For example, the gas separation system, and therefore the turbocharger system, may be included at a hydrofracturing well site, and the $CO_2$ captured and sequestered by the gas separation system may be used as a fracturing fluid for releasing trapped hydrocarbons from a reservoir rock formation. Note that, as used herein, the term "couple" is not limited to a direct mechanical, electrical, and/or communication connection between components, but may also include an indirect mechanical, electrical, and/or communication connection (including fluid communication) between multiple components. The turbocharger system may receive gases from the gas generating system, compress the received gases into a process gas, and output the process gas to the $CO_2$ capture system for further treatment and processing, as described below.

In the embodiment shown in FIG. 1, the turbocharger system 100 includes a low pressure turbocharger (LPT) stage 110, a mid-pressure turbocharger (MPT) stage 120 coupled downstream from the LPT stage, and a high pressure turbocharger (HPT) stage 130 coupled downstream from the MPT stage. The LPT stage includes a LPT compressor 112 rotationally coupled to a LPT turbine 114 via a LPT rotor (e.g., shaft) 115, the MPT stage includes a MPT compressor 122 rotationally coupled to a MPT turbine 124 via a MPT rotor 125, and the HPT stage includes a HPT compressor 132 rotationally coupled to a HPT turbine 134 via a HPT rotor 135. Although the embodiment shown in FIG. 1 includes a single turbocharger at each turbocharger stage, in other examples, the turbocharger system may include more than one turbocharger at each turbocharger stage. As one example, the LPT stage may include a second turbocharger coupled in parallel, including a second LPT compressor and a second LPT turbine rotationally coupled by a second LPT rotor.

The LPT rotor, the MPT rotor, and the HPT rotor are not mechanically coupled to each other, such that the low pressure turbocharger, the mid-pressure turbocharger, and the high pressure turbocharger are operable at speeds independent of each other. In some such embodiments, operating the turbocharger stages at independent speeds helps maintain a desired pressure and flow rate of output process gas across varying ambient conditions and/or operating points of the turbocharger system.

During operation, inlet gas 102 from the gas generating system is received by a heat exchanger 104. The inlet gas includes $CO_2$ mixed with other components and retains residual heat from the gas generating system, such that the inlet gas is at an exhaust temperature above a temperature of ambient air. In an example where the gas generating system is a diesel engine, the inlet gas includes hot exhaust gas from the combustion of air and fuel at the diesel engine. The heat exchanger receives the hot inlet gas and places it into thermal communication with cooler HPT compressed process gas 133 such that at least a portion of the residual heat of the inlet gas is transferred to the HPT compressed process gas. In this way, via the heat exchanger, the hotter inlet gases from the gas generating system transfer heat to the cooler HPT compressed process gas, the generation of which will be described below.

The heat exchanger discharges a cooled inlet (or input) process gas 111 to the LPT compressor, where it is compressed. As used herein, the term "process gas" refers to gas flowing through the turbocharger system, from the inlet process gas to an output process gas 140. In some examples, a cooler and/or electric blower 103 may be optionally included between an inlet of the LPT compressor and an outlet of the heat exchanger, in a flow path of the cooled inlet process gas. The cooler and/or electric blower may further reduce a temperature of the cooled inlet process gas provided to the LPT compressor and/or increase a pressure of the cooled inlet process gas. As one example, the cooler may further lower the temperature of the cooled inlet process gas provided to the LPT compressor, thereby reducing an amount of power needed to compress the inlet process gas, a scale of the LPT compressor, and/or a thermal load on the LPT compressor. As another example, the electric blower may be used during a starting operation of the turbocharger system, before process gas flow through the LPT turbine is able to drive the LPT compressor at a desired speed, as well as to provide supplemental power to the Brayton cycle loop during operation by increasing the pressure of the cooled inlet process gas. In some embodiments, in addition to including the electric blower or instead of including the electric blower, one or more of the low pressure turbocharger, the mid-pressure turbocharger, and the high pressure turbocharger may be electrically assisted. The electrically assisted turbocharger(s) may include an electric motor rotationally coupled to the compressor and the turbine. For example, the electric motor may draw electric power from an energy storage device (e.g., a battery) to drive the compressor and the turbine at a desired speed, including during the starting operation of the turbocharger system. The electric motor may be selectively operated in an assist mode, where the electric motor draws electrical power from the energy storage device to supplement the process gas-driven power provided by the corresponding turbine, or in a regeneration mode, where the electric motor converts kinetic energy of the rotating electrically assisted turbocharger into electrical energy that may be stored at the energy storage device.

The LPT compressor discharges LPT compressed process gas 113, which flows toward the MPT compressor, coupled in series with the LPT compressor. The LPT compressed process gas passes through a first intercooler 119 positioned in flow communication between an outlet of the LPT compressor and an inlet of the MPT compressor. The first intercooler is suitably configured to decrease a temperature of the received LPT compressed process gas. As one non-limiting example, the first intercooler places the LPT compressed process gas into thermal communication with a suitable flow of fluid (not shown) that is at a lower temperature than the LPT compressed process gas received by the first intercooler. In this way, the first intercooler is configured to remove at least a portion of the heat imparted to the LPT compressed process gas by the LPT compressor, thereby increasing a density of the LPT compressed process gas discharged from the first intercooler and received by the MPT compressor as MPT compressor inlet flow 121.

The MPT compressor receives the MPT compressor inlet flow, further compresses the MPT compressor inlet flow, and discharges MPT compressed process gas 123, which flows toward the HPT compressor, coupled in series with the MPT compressor. Having gone through two compressor stages, the MPT compressed process gas has a higher pressure than the LPT compressed process gas. The discharged MPT compressed process gas passes through a second intercooler 129 positioned in flow communication between an outlet of the MPT compressor and an inlet of the HPT compressor. Similar to the first intercooler, the second intercooler is suitably configured to decrease a temperature of the received MPT compressed process gas. As one non-limiting example, the second intercooler places the MPT compressed process gas into thermal communication with a suitable flow of fluid (not shown) that is at a lower temperature than the MPT compressed process gas received by the second intercooler. In this way, the second intercooler is configured to remove at least a portion of the heat imparted to the MPT compressed process gas by the MPT compressor, thereby increasing a density of the MPT compressed process gas discharged from the second intercooler and received by the HPT compressor as HPT compressor inlet flow 131. By intercooling between the LPT stage and the MPT stage and again between the MPT stage and the HPT stage, the MPT compressor and the HPT compressor can do more compression work for a same amount of power and reduces a pressure ratio across each compressor (compared to when there is not intercooling between the compression stages). Further, a heat load on each intercooler is lower, so the first intercooler and the second intercooler may be downsized. Further still, intercooling results in lower compressor inlet and discharge temperatures for the MPT compressor and the HPT compressor, which enables more (and lower cost) material options for the compressor wheels (e.g., aluminum).

The HPT compressor receives the HPT compressor inlet flow, further compresses the HPT compressor inlet flow, and discharges the HPT compressed process gas 133. The HPT compressed process gas, having been compressed by three compression stages, is at a higher pressure than both the LPT compressed process gas discharged by the LPT compressor and the MPT compressed gas discharged by the MPT compressor. As described above, the HPT compressed process gas flows toward the heat exchanger, where the HPT compressed process gas may extract heat from the hotter inlet gas 102. A third intercooler 139 may be optionally included downstream of the HPT compressor to cool the HPT compressed process gas prior to flowing to the heat exchanger, thereby increasing an efficiency of heat extraction from the inlet gas. However, prior to reaching the heat exchanger, the HPT compressed process gas flow is divided so that a portion of the HPT compressed gas is routed to the $CO_2$ capture system 150 as the output process gas 140, the output process gas serving as the overall output of the turbocharger system. For example, the HPT compressed process gas may flow to an inlet of the heat exchanger via a first flow path, and a second flow path that branches from the first flow path may flow the process gas to the $CO_2$ capture system. The $CO_2$ capture system may include systems and processes for capturing and sequestering $CO_2$, such as by performing a membrane separation of $CO_2$ from other components of the output process gas, for example. In another example, the $CO_2$ capture system may be in-line with the heat exchanger, in the first flow path between an outlet of the HPT compressor and the inlet of the heat exchanger, as shown by dashed box 150. In such an example, all of the HPT compressed process gas passes through the $CO_2$ capture system, and non-captured gas continues to the heat exchanger while the $CO_2$ capture system sequesters separated $CO_2$, which may be an overall output of the turbocharger system as captured $CO_2$ 152. In still other examples, the $CO_2$ capture system may instead be any downstream process configured to receive at least a portion of waste heat-containing process gas that has been compressed.

In the depicted embodiment, a choke valve 142 is positioned in the first flow path, upstream of the inlet of the heat exchanger and downstream of where the second flow path branches from the first flow path. Thus, the choke valve is positioned between a compression section of the turbocharger system, including the LPT compressor, the MPT compressor, and the HPT compressor, and a heating section of the turbocharger system, including the heat exchanger. The choke valve may be configured to throttle the flow of the HPT compressed process gas through the heat exchanger, thereby driving higher compressor pressures and reducing a flow rate of the process gas through the turbocharger system. As described below, the choke valve may be an electronically controlled valve that is adjusted into different positions (e.g., fully open, fully closed, and a plurality of positions therebetween) via electronic signals received from a controller.

As mentioned above, the HPT compressed process gas flows through the heat exchanger, where it extracts heat from the hotter inlet gas. The heated HPT compressed process gas is discharged from the heat exchanger as a HPT turbine inlet flow 144. The HPT turbine receives the HPT turbine inlet flow, and the HPT turbine inlet flow imparts a rotational force on the HPT rotor to drive the HPT compressor. The HPT turbine exhausts the HPT turbine inlet flow as a MPT turbine inlet flow 138. The MPT turbine, coupled in series with the HPT turbine, receives the MPT turbine inlet flow, and the MPT turbine inlet flow imparts a rotational force on the MPT rotor to drive the MPT compressor. The MPT turbine exhausts the MPT turbine inlet flow as a LPT turbine inlet flow 128, which is received by the LPT turbine, coupled in series with the MPT turbine, and imparts a rotational force on the LPT rotor to drive the LPT compressor. The LPT turbine inlet flow is exhausted by the LPT turbine to atmosphere as a LPT turbine exhaust 118.

As one example, an amount of energy available in the MPT turbine inlet flow for driving the MPT turbine may be lower than an amount of energy available in the HPT turbine inlet flow for driving the HPT turbine, and an amount of compression work performed by the MPT compressor may be correspondingly lower than that performed by the HPT compressor. Similarly, an amount of energy available in the LPT turbine inlet flow for driving the LPT turbine may be lower than the amount of energy available in the MPT turbine inlet flow for driving the LPT turbine, and an amount of compression work performed by the LPT compressor may be correspondingly lower than the amount performed by the MPT compressor.

The turbocharger system may include turbine bypass valve(s) coupled across one or more stages. In the embodiment shown in FIG. 1, the turbocharger system includes a HPT turbine bypass valve 137, a MPT turbine bypass valve 127, and a LPT turbine bypass valve 117, although in other embodiments, the turbocharger system may include a subset of the turbine bypass valves depicted in FIG. 1. For example, the turbocharger may include the HPT turbine bypass valve and the MPT turbine bypass valve but not the LPT turbine bypass valve, or the turbocharger system may include the HPT turbine bypass valve and not the MPT turbine bypass valve or the LPT turbine bypass valve. The HPT turbine bypass valve may be operated to control a HPT turbine bypass flow 136. For example, when the HPT turbine bypass valve is at least partially open, the HPT turbine bypass flow may direct at least a portion of the HPT turbine inlet flow from an inlet of the HPT turbine to an outlet of the HPT turbine, thereby reducing the work done on the HPT turbine and, as a result, a speed of the HPT turbine and the HPT compressor. The MPT turbine bypass valve and the LPT turbine bypass valve may be operated similarly to control a MPT turbine bypass flow 126 and a LPT turbine bypass flow 116, respectively. As will be elaborated below, each of the HPT turbine bypass valve, the MPT turbine bypass valve, and the LPT turbine bypass valve may be an electronically controlled valve that is adjusted into different positions (e.g., fully open, fully closed, and a plurality of positions therebetween) via electronic signals received from a controller in order to adjust a pressure and flow rate of the process gas output by the turbocharger system.

A controller 170 is operatively coupled to at least one sensor 16, examples of which are described herein, and at least one actuator 81, examples of which are also described herein. For example, the at least one sensor may include various temperature, pressure, mass flow, and speed sensors coupled throughout the turbocharger system that provide electronic feedback signals to the controller, such as a pressure and/or mass flow sensor 160 configured to measure a pressure and/or mass flow of the HPT compressed process gas upstream of the choke valve, and the at least one actuator may include the choke valve 142, the HPT turbine bypass valve 137, the MPT turbine bypass valve 127, and the LPT turbine bypass valve 117. The controller may receive input data from the various sensors, process the input data, and trigger the actuators (e.g., the choke valve, the HPT turbine bypass valve, the MPT turbine bypass valve, and/or the LPT turbine bypass valve) in response to the processed input data based on instruction or code programmed in a memory of the controller corresponding to one or more routines, an example of which is described with respect to FIG. 2.

As one example, the controller is programmed to adjust a position of the choke valve in order to adjust a flow rate of the process gas through the turbocharger system (e.g., through the compressors of the turbocharger system). As another example, the controller is programmed to adjust a position of one or more of the HPT turbine bypass valve, the MPT turbine bypass valve, and the LPT turbine bypass valve in order to adjust a pressure of the process gas output by the turbocharger system. As still another example, the controller is programmed to adjust the position of the choke valve and the position of one or more of the HPT turbine bypass valve, the MPT turbine bypass valve, and the LPT turbine bypass valve in combination in order to achieve a desired flow rate of process gas through the turbocharger system and pressure setpoint of the process gas output by the turbocharger system. For example, without actively controlling the flow rate of the process gas through the turbocharger system and the pressure of the process gas output by the turbocharger system via the choke valve and the turbine bypass valve(s), the flow rate and pressure may vary based on boundary conditions, including ambient conditions (e.g., ambient temperature and pressure) and operating conditions of the gas generating system (e.g., a load of the gas generating system, a temperature of the inlet gas produced by the gas generating system, and a pressure of the inlet gas produced by the gas generating system). Therefore, in order to achieve the desired flow rate and pressure setpoint at a given set of boundary conditions, the controller may actively vary the positions of the choke valve and the turbine bypass valve(s). The choke valve and the turbine bypass valve(s) both affect both pressure and flow rate, but the choke valve has a greater effect on the flow rate than the pressure and the turbine bypass valve(s) have a greater effect on the pressure than the flow rate. Therefore, as one example, adjusting the choke valve to a further closed position decreases the flow rate of the process gas by restricting the flow of the HPT compressed process gas through the heat exchanger. As another example, adjusting one or more of the turbine bypass valve(s) to a further closed position increases the pressure of the process gas by increasing an amount of work done on the corresponding compressor. By actively adjusting the choke valve and the turbine bypass valve(s), the flow rate of the process gas through the compressors of the turbocharger system and the pressure of the process gas output by the turbocharger system may be decoupled from the turbine hardware. For example, the flow rate of the turbocharger system may be adjusted based on that of the gas generating system so as to not affect the operation of the gas generating system. As another example, the pressure of the turbocharger system may be adjusted to avoid releasing gas into the atmosphere or avoid drawing in gas from the atmosphere, such as when the inlet gas path is coupled to atmosphere. As still another example, the combination of the choke valve and the turbine bypass valve(s) enables the turbocharger system to maximize the pressure and flow rate of the process gas within the thermodynamic limits of the system and the boundary conditions to increase the output of the $CO_2$ capture system.

The controller may be comprised of one or more electronic computing devices, including at least one processing device (e.g., a central processing unit, graphics processing unit, microcontroller, and/or any other circuit or processing device capable of executing the functions described herein) and at least one memory chip, including an electronic storage medium for executable programs and calibration values (e.g., non-transitory read-only memory), random access memory, and keep alive memory. Communication between the controller and the at least one sensors and between the controller and the at least one actuator may be obtained through any suitable connection, such as via hardwired or a wireless arrangement. Although the controller is illustrated as a discrete system, the controller may be implemented at least partially by at least one processor embedded within any component of the rotary machine. The above examples are exemplary only, and thus are not intended to limit in any way the definition and/or meaning of the terms controller and processing device.

Figure 2:
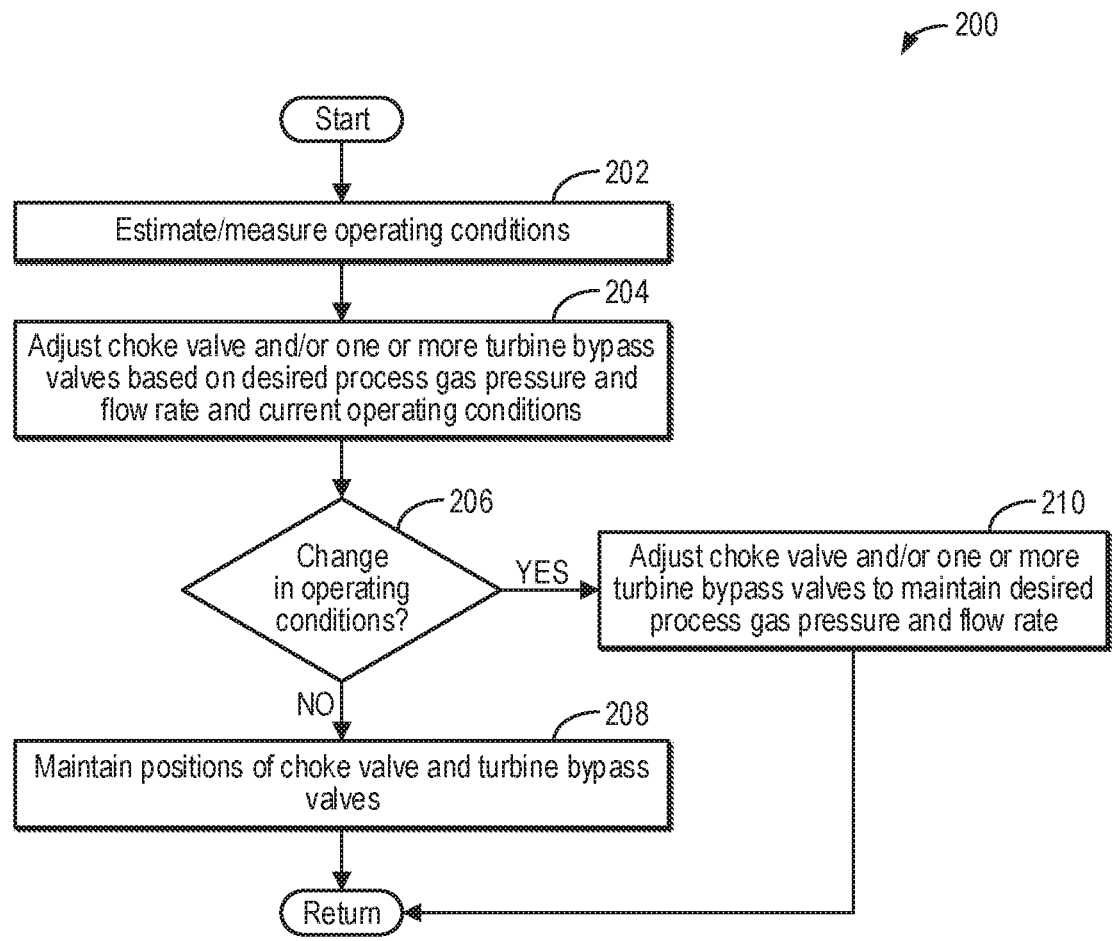
FIG. 2 is a flow chart showing a method for adjusting operation of a Brayton cycle turbocharger system to produce a desired pressure and flow rate of process gas, according to an embodiment of the invention.

Next, FIG. 2 shows an example method 200 for one or more valves of a Brayton cycle turbocharger system included in a gas separation system, such as the Brayton cycle turbocharger system shown in FIG. 1, in order to output a process gas at a desired pressure and maintain a flow rate of the turbocharger system at a desired flow rate. Instructions for carrying out method 200 may be executed by a controller (e.g., controller 170 of FIG. 1) based on instructions stored on a memory of the controller and in conjunction with signals received from sensors of the turbocharger system, such as the sensors described above with reference to FIG. 1 (e.g., sensors 16 and pressure and/or mass flow sensor 160 of FIG. 1). The controller may employ actuators of the turbocharger system (e.g., choke valve 142, HPT turbine bypass valve 137, MPT turbine bypass valve 127, and LPT turbine bypass valve 117 of FIG. 1) to adjust turbocharger system operation according to the methods described below.

At 202, method 200 includes estimating and/or measuring operating conditions. The operating conditions may include ambient conditions, such as ambient temperature and ambient pressure; operating conditions of a gas generating system supplying inlet gas to the turbocharger system (e.g., gas generating system 101 of FIG. 1), such as a mass flow rate (or load) of the gas generating system and a temperature of the inlet gas discharged by the gas generating system and received by a heat exchanger of the turbocharger system (e.g., heat exchanger 104 of FIG. 1); and operating conditions of the turbocharger system, such as a current flow rate of gas through the turbocharger system, a current pressure of the process gas output by the turbocharger system, a desired flow rate of the turbocharger system, a desired pressure of the process gas output by the turbocharger system, a pressure ratio across a HPT compressor, a mass flow through the HPT compressor, a pressure ratio across a MPT compressor, a mass flow through the MPT compressor, a pressure ratio across a LPT compressor, and a mass flow through the LPT compressor. The operating conditions may further include operating conditions of a $CO_2$ capture system (e.g., $CO_2$ capture system 150 of FIG. 1), such as a current separation efficiency and/or production rate.

As one example, the desired flow rate of gas of (e.g., through) the turbocharger system may be determined based on the flow rate of the inlet gas provided by the gas generating system. For example, the desired flow rate of gas flowing through the turbocharger system may be selected to match the flow rate of the inlet gas. Therefore, in one example, the desired flow rate refers to a desired flow rate of process gas entering the LPT compressor. The desired flow rate may be further adjusted based on a compressor map width (e.g., from a surge limit to a choke limit) of each of the compressors. The desired pressure may be determined based on conditions of the $CO_2$ capture system, such as to achieve a target production rate, separation efficiency, and/or pressure ratio across a membrane of the $CO_2$ capture system. As one example, the controller may input the target production rate, separation efficiency, and/or pressure ratio across the membrane into a look-up table, algorithm, or map, which may output the desired pressure for the given conditions. The desired pressure may be further adjusted based on mechanical limitations of the turbochargers (thrust load, pressure load in cases/joints. etc.).

At 204, method 200 includes adjusting the choke valve and/or one or more turbine bypass valves based on a desired process gas pressure and flow rate and the current operating conditions. In particular, adjusting the choke valve may primarily affect the flow rate of the process gas through the turbocharger system (but also affects the pressure), and adjusting the one or more turbine bypass valves may primarily affect the pressure of the process gas output by the turbocharger system (but also affects the flow rate). In some examples, the controller may input the operating conditions and the desired process gas pressure and flow rate into one or more look-up tables, algorithms, or maps stored in a memory of the controller, which may output the corresponding choke valve and turbine bypass valve positions for generating the desired process gas pressure and flow rate at the given operating conditions. In other examples, the controller may make a logical determination (e.g., regarding positions of each of the choke valve, the HPT turbine bypass valve, the MPT turbine bypass valve, and the LPT turbine bypass valve) based on logic rules that are a function of the operating conditions and the desired process gas pressure and flow rate. The controller may then send a control signal to each of the choke valve, the HPT turbine bypass valve, the MPT turbine bypass valve, and the LPT turbine bypass valve to actuate each valve to the corresponding determined position.

As one example, when the current flow rate is higher than the desired flow rate, the controller may actuate the choke valve to a further closed position to decrease the flow rate, with an opening of the choke valve decreasing as the desired flow rate decreases. Conversely, when the current flow rate is less than the desired flow rate, the controller may actuate the choke valve to a further open position to increase the flow rate, with the opening of the choke valve increasing as the desired flow rate increases until the choke valve reaches a fully open position. As another example, when the current pressure is higher than the desired pressure, the controller may actuate one or more of the turbine bypass valves to a further open position to decrease the pressure, with an opening of the one or more turbine bypass valves increasing as the desired pressure decreases until the one or more turbine bypass valves reaches a fully open position. Conversely, when the current pressure is less than the desired pressure, the controller may actuate the one or more turbine bypass valves to a further closed position to increase the pressure, with the opening of the one or more turbine bypass valves decreasing as the desired pressure increases until the one or more turbine bypass valves reaches a fully closed position. As an example, the controller may adjust the one or more turbine bypass valves sequentially, such as by first adjusting the HPT turbine bypass valve, then adjusting the MPT turbine bypass valve if the desired pressure cannot be met with the adjustments to the HPT turbine bypass valve alone. Then, the controller may adjust the LPT turbine bypass valve if the desired pressure cannot be met with adjustments to the HPT turbine bypass valve and the MPT turbine bypass valve. As another example, one or more of the HPT turbine bypass valve, the MPT turbine bypass valve, and the LPT turbine bypass valve may be adjusted simultaneously. As still another example, in order to compensate for the effect of the turbine bypass valve adjustment(s) on the flow rate and the effect of the choke valve adjustment on the pressure, the controller may adjust the choke valve to a further open position than for the desired flow rate (if the turbine bypass valves were not adjusted) and further increase an opening of each of the HPT turbine bypass valve and the MPT turbine bypass valve than for the desired pressure (if the choke valve were not adjusted).

As a further example, the controller may employ a proportional integral derivative (PID) control strategy to adjust the choke valve and the one or more turbine bypass valves in order to drive the current process gas pressure and flow rate to the desired process gas pressure and flow rate.

Figure 3:
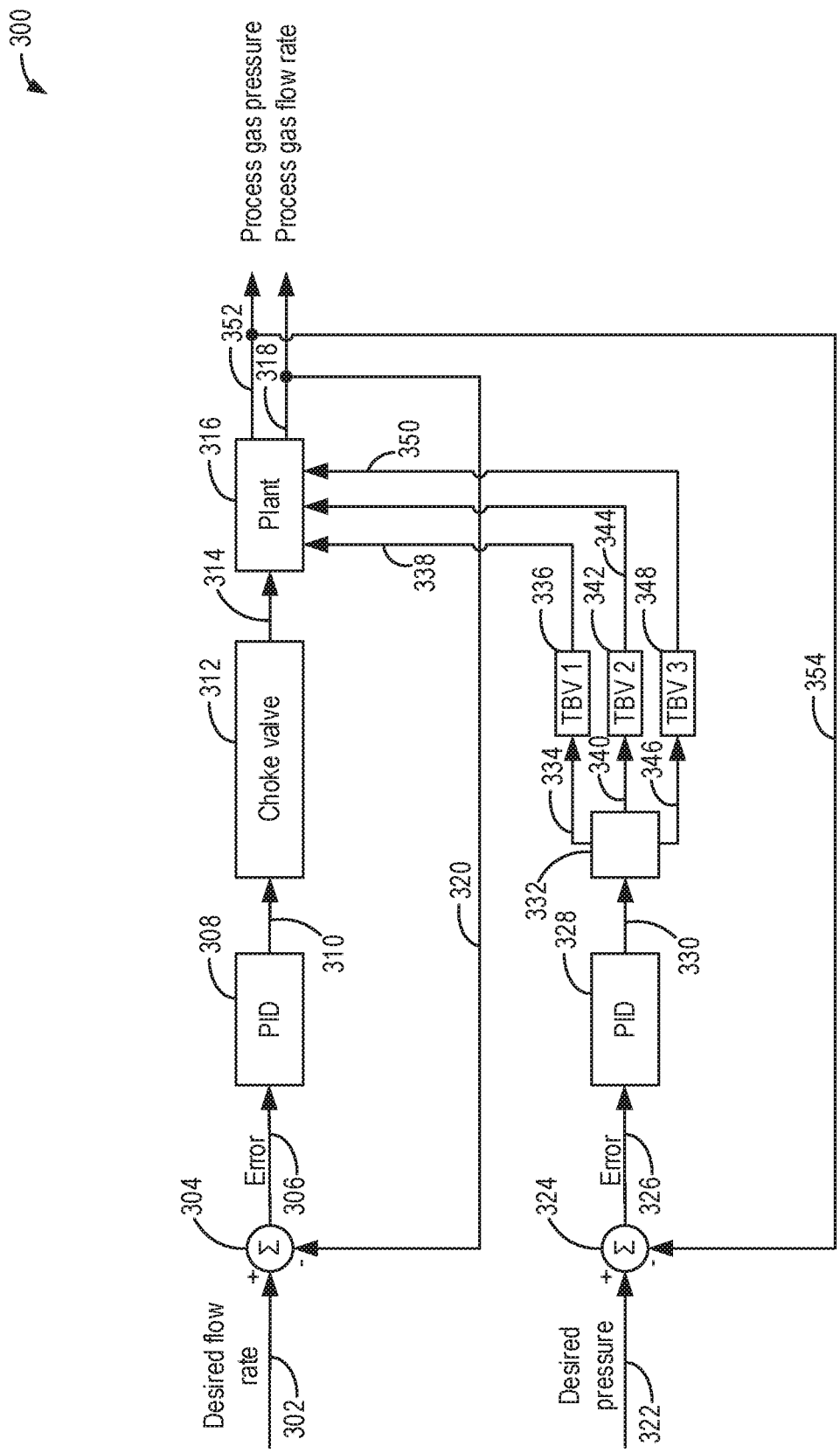
FIG. 3 schematically shows a control strategy for adjusting a choke valve and one or more turbine bypass valves of a Brayton cycle turbocharger system to produce a desired pressure and flow rate of process gas, according to an embodiment of the invention.

Turning briefly to FIG. 3, a block diagram of an example PID control strategy 300 is shown. The PID control strategy may be employed by a controller (e.g., controller 170 of FIG. 1) and include parallel control loops for driving a current process gas pressure and flow rate of a Brayton cycle turbocharger system (e.g., Brayton cycle turbocharger system 100 of FIG. 1) to a desired (e.g., setpoint) process gas pressure and desired (e.g., setpoint) process gas flow rate by adjusting a position of a choke valve (e.g., choke valve 142 of FIG. 1) and one or more turbine bypass valves (e.g., HPT turbine bypass valve 137, MPT turbine bypass valve 127, and LPT turbine bypass valve 117 of FIG. 1) of the turbocharger system. For example, the desired process gas flow rate is a desired flow rate of process gas through the turbocharger system. In one example, the desired process gas flow rate refers to a desired flow rate of process gas entering a first compressor of the turbocharger system (e.g., inlet process gas 111 shown in FIG. 1). As another example, the desired process gas pressure may refer to a desired pressure of process gas output the turbocharger system (e.g., output process gas 140 shown in FIG. 1).

The controller receives the desired process gas flow rate (e.g., desired flow rate of gas through the compressors of the turbocharger system) 302, which is input into a summing junction 304 along with a process gas flow rate feedback signal 320. The process gas flow rate feedback signal is from the current process gas flow rate, such as measured by a mass flow sensor. A difference between the desired process gas flow rate and the process gas flow rate feedback signal is determined at the summing junction, generating a resulting flow rate error value 306, which is input into a PID choke valve model 308. The PID choke valve model uses the flow rate error value to update the choke valve position. For example, the controller may continuously calculate the flow rate error value as the difference between the desired process gas flow rate and the process gas flow rate feedback signal and apply a correction 310 to a choke valve setting (or position) 312 based on proportional, integral, and derivative terms. As an example, when the error value is positive (e.g., the desired process gas flow rate is greater than the process gas flow rate feedback signal), the correction may increase an opening of the choke valve setting. Conversely, when the error value is negative (e.g., the desired process gas flow rate is less than the process gas flow rate feedback signal), the correction may decrease the opening of the choke valve setting. A resulting control signal 314 for the corrected choke valve setting may be transmitted to an actuator of the choke valve within a plant 316, which schematically represents the Brayton cycle turbocharger system, to adjust the position of the choke valve. The adjusted choke valve results in an updated process gas flow rate 318 as an output of the PID control strategy, which is also used to generate the process gas flow rate feedback signal, as described above.

Simultaneously, the controller receives the desired process gas pressure 322, which is input into a summing junction 324 along with a process gas pressure feedback signal 354. The process gas pressure feedback signal is from the current process gas pressure, such as measured by a pressure sensor. A difference between the desired process gas pressure and the process gas pressure feedback signal is determined at the summing junction, generating a resulting pressure error value 326, which is input into a PID turbine bypass valve model 328. The PID turbine bypass valve model uses the pressure error value to update the position of one or more turbine bypass valves. For example, the controller may continuously calculate the pressure error value as the difference between the desired process gas pressure and the process gas pressure feedback signal and transmit an overall correction value 330 to a valve logic 332 based on proportional, integral, and derivative terms. As an example, when the error value is positive (e.g., the desired process gas pressure is greater than the process gas pressure feedback signal), the overall correction value may decrease an opening of one or more of the turbine bypass valves to drive the process gas pressure to the desired process gas pressure. Conversely, when the error value is negative (e.g., the desired process gas pressure is less than the process gas pressure feedback signal), the overall correction value may increase the opening of one or more of the turbine bypass valves.

The controller may use the valve logic to determine an individual correction value to apply to one or more or each of the turbine bypass valves. In the example shown in FIG. 3, three turbine bypass valves are shown, as described above with respect to the system of FIG. 1, although a different number of turbine bypass valves may be included in the logic in other examples. The valve logic determines a first correction 334 to apply to a first turbine bypass valve position (TBV 1) 336, and the resulting control signal 338 is transmitted to an actuator of the first turbine bypass valve in the plant 316 to adjust the position of the first turbine bypass valve to a position corresponding to the first correction. The valve logic additionally or alternatively determines a second correction 340 to apply to a second turbine bypass valve position (TBV 2) 342, and the resulting control signal 344 is transmitted to an actuator of the second turbine bypass valve in the plant to adjust the position of the second turbine bypass valve to a position corresponding to the second correction. The valve logic additionally or alternatively determines a third correction 346 to apply to a third turbine bypass valve position (TBV 3) 348, and the resulting control signal 350 is transmitted to an actuator of the third turbine bypass valve in the plant to adjust the position of the third turbine bypass valve to a position corresponding to the third correction. In some examples, the valve logic may adjust more than one turbine bypass valve simultaneously based on the overall correction value. In other examples, the valve logic may adjust the turbine bypass valves sequentially based on the overall correction value. The adjustments to the first, second, and/or third turbine bypass valves results in an updated process gas pressure 352 as an output of the PID control strategy, which is also used to generate the process gas pressure feedback signal, as described above.

Further, in some examples, the PID choke valve model and the PID turbine bypass valve model may communicate with each other since adjustments to the choke valve also affect the process gas pressure and adjustments to the turbine bypass valves also affect the process gas flow rate. For example, in response to the PID choke valve model reaching an adjustment limit of the choke valve while a non-zero flow rate error value is produced, the position of the one or more turbine bypass valves may be also adjusted to drive the flow rate error value toward zero.

Returning to FIG. 2, at 206, method 200 includes determining if a change in operating conditions has occurred. For example, the operating conditions may change due to a change in ambient conditions (e.g., an increase or decrease of the ambient temperature and/or pressure) and/or a change in the gas generating system operating conditions (e.g., an increase or decrease in the load), which may in turn shift the operating points of the turbocharger system compressors. As another example, the desired process gas pressure and flow rate may change, such as due to a change in the flow rate of inlet gas received from the gas generating system or due to a change in the operating conditions of the $CO_2$ capture system. In one example, the method at 206 may include determining if there has been a change in operating conditions that changes the desired position of the choke valve and/or one or more turbine bypass valves. For example, the controller may automatically and continuously (e.g., in real-time as operating conditions change, as determined from received signals from various sensors of the system) determine the desired positions of each of the choke valve, the HPT turbine bypass valve, the MPT turbine bypass valve, and the LPT turbine bypass valve, as described above at 204. If the newly determined desired position of any of the choke valve, the HPT turbine bypass valve, the MPT turbine bypass valve, and the LPT turbine bypass valve is different than the current position of the corresponding valve, the controller may determine a change in operating conditions has occurred.

If a change in operating conditions, as discussed above, has not occurred (e.g., the operating conditions have remained substantially constant), method 200 proceeds to 208 and includes maintaining the positions of the choke valve and the turbine bypass valves. For example, the turbine backpressure valve may be held at the position determined above at 204 to continue outputting the process gas to the $CO_2$ capture system at the desired pressure and continue flowing the process gas through the turbocharger system at the desired flow rate. Following 208, method 200 may return.

If the operating conditions have changed, method 200 proceeds to 210 and includes adjusting the choke valve and/or one or more turbine bypass valves to maintain the desired pressure of the process gas output by the turbocharger system and flow rate of the process gas through the turbocharger system. For example, the controller may input the updated operating conditions into the one or more look-up tables, algorithms, or maps stored in the memory of the controller, which may output the corresponding updated choke valve and turbine bypass valve positions for generating the desired process gas pressure and flow rate. As another example, the controller may input the change(s) in the operating conditions into one or more look-up tables, algorithms, or maps, which may output a corresponding change in the positions of the choke valve and/or the one or more turbine bypass valves. The controller may then send a control signal to the choke valve and/or to one or more of the turbine bypass valves to actuate the corresponding valve(s) to the updated position. As one example, if an increase in ambient temperature increases a temperature of intercoolers between the compressor stages, the turbine bypass valve(s) may be further closed to compensate for the higher temperature (and therefore less dense) compressed air, with the choke valve adjusted accordingly to maintain the flow rate matched to the inlet gas flow rate. As another example, as the ambient pressure increases, the process gas pressure increases, and so the turbine bypass valve(s) may be further opened to compensate. As still another example, an increase in a temperature of the inlet gas discharged by the gas generating system and received by the heat exchanger will increase the pressure and flow rate on the Brayton cycle loop. As a result, the turbine bypass valve(s) may be adjusted to further open positions to reach the desired process gas pressure, and the choke valve may be adjusted correspondingly to maintain the flow rate matched to the inlet gas flow rate. As a further example, as the inlet gas flow rate increases, the choke valve may be further opened to accommodate the increased inlet gas flow rate, and the turbine bypass valve(s) may be adjusted accordingly to maintain the process gas pressure at the target process gas pressure. Following 210, method 200 may return.

Next, FIG. 4 shows an example timeline 400 for adjusting a choke valve and a turbine bypass valve of a Brayton cycle turbocharger system (e.g., Brayton cycle turbocharger system 100 of FIG. 1) to provide a desired flow rate of process gas through the turbocharger system and pressure of a process gas output by the turbocharger system. For example, a controller (e.g., controller 170 of FIG. 1) may adjust the choke valve and the turbine bypass valve in response to a change in operating conditions, such as according to the example method of FIG. 2 and/or using the example PID control strategy of FIG. 3. Although only one turbine bypass valve is shown in the example of timeline 400, it should be understood that more than one turbine bypass valves may be included in the turbocharger system, such as two turbine bypass valves or a turbine bypass valve coupled across each turbine of the turbocharger system. Further, it should be understood that changes in additional operating conditions, such as ambient temperature, a temperature of inlet gas provided to a heat exchanger of the turbocharger system, etc., may result in adjustments to the choke valve and/or the turbine bypass valve.

In timeline 400, an inlet gas flow rate is shown in plot 402, a desired process gas pressure is shown in dashed plot 403, an actual (e.g., produced or measured) process gas pressure is shown in plot 404, a desired process gas flow rate is shown in dashed plot 405, an actual (e.g., produced or measured) process gas flow rate is shown in plot 406, a position of the choke valve is shown in plot 408, and a position of the turbine bypass valve is shown in plot 410. For all of the above, the horizontal axis represents time, with time increasing along the horizontal axis from left to right. The vertical axis represents each labeled parameter. For plots 402, 403, 404, 405, and 406, the labeled parameter increasing along the vertical axis from bottom to top. For Plots 408 and 410, the vertical axis represents the position of the corresponding valve, with the position ranging from fully closed to fully open, as labeled.

In the example of FIG. 4, the process gas flow rate (plot 406) refers to an inlet process gas flow rate (e.g., of inlet process gas 111 shown in FIG. 1). Similarly, the desired process gas flow rate (dashed plot 405) refers to a desired inlet gas flow rate. The process gas pressure (plot 404) refers to a pressure of the process gas output by the turbocharger system (e.g., output process gas 140 shown in FIG. 1). Similarly, the desired process gas pressure (dashed plot 403) refers to a desired output process gas pressure (e.g., downstream of a final compressor of the turbocharger system, such as HPT compressor 132 of FIG. 1).

Prior to time t1, the turbocharger system is operated to compress the inlet gas received from a gas generating system (e.g., gas generating system 101 of FIG. 1) and output the compressed gas as process gas to a $CO_2$ capture system (e.g., $CO_2$ capture system 150 of FIG. 1). For example, the choke valve position (plot 408) and the turbine bypass valve position (plot 410) may be selected by the controller based on operating conditions, including (but not limited to) the inlet gas flow rate (plot 402), the desired process gas pressure (dashed plot 403), and the desired process gas flow rate (dashed plot 405), as described above with respect to FIG. 2. For example, the desired process gas flow rate (dashed plot 405) may be matched to the inlet gas flow rate (plot 402), as illustrated in timeline 400. As a result, the pressure of the process gas output by the turbocharger system (plot 404) is equal to the desired process gas pressure (dashed plot 403), and the flow rate of the process gas through the turbocharger system (plot 406) is equal to the desired process gas flow rate (dashed plot 405). Further, prior to time t1, the operating conditions, including the inlet gas flow rate (plot 402) (and, accordingly, the desired process gas flow rate show in dashed plot 405) and the desired process gas pressure (dashed plot 403), remain relatively constant.

At time t1, the desired process gas pressure increases (dashed plot 403) while the inlet gas flow rate (plot 402), and therefore the desired process gas flow rate (dashed plot 405), remains constant. In response to the increased desired process gas pressure, the controller adjusts the choke valve and the turbine bypass valve to updated positions. In the example at time t1, the controller actuates the turbine bypass valve to a further closed position (plot 410) to reduce an amount of gas flow bypassing the turbine, thereby increasing an amount of work on the corresponding compressor and increasing the pressure of the process gas (plot 404) to the desired process gas pressure (dashed plot 403). Due to the effect of the turbine bypass valve on the flow rate of the process gas, the controller subsequently actuates the choke valve to a further closed position (plot 408) to reduce the higher flow rate driven by the higher pressure and maintain the process gas flow rate (plot 406) at the desired flow rate (dashed plot 405). In another example, the controller may simultaneously actuate the turbine bypass valve and the choke valve. For example, the controller may refer to a look-up table for the corresponding turbine bypass valve and choke valve positions that will produce the desired process gas pressure (dashed plot 403) and desired process gas flow rate (dashed plot 405) at the given inlet gas flow rate (plot 402).

At time t2, the inlet gas flow rate decreases (plot 402), thereby decreasing the desired process gas flow rate (dashed plot 405), while the desired process gas pressure (dashed plot 403) remains constant. In response to the decreased inlet gas flow rate, the controller actuates the choke valve to a further closed position (plot 408) to reduce an intake flow of the turbocharger system to match the reduced inlet flow rate and simultaneously actuates the turbine bypass valve to a further closed position (plot 410) to further reduce an amount of gas flow bypassing the turbine to compensate for the decreased inlet gas flow rate. For example, the controller may refer to a look-up table for the corresponding turbine bypass valve and choke valve positions that will produce the desired process gas pressure (dashed plot 403) and desired process gas flow rate (dashed plot 405) at the reduced inlet gas flow rate (plot 402). In another example, the controller may actuate the choke valve and the turbine bypass valve sequentially, such as by first adjusting the choke valve to the further closed position and then adjusting the turbine bypass valve to the further closed position based on a difference between the desired process gas pressure (dashed plot 403) and the current process gas pressure (plot 404). As a result, the process gas pressure (plot 404) is maintained at the desired process gas pressure (dashed plot 403) and the process gas flow rate (plot 406) is reduced to the updated, reduced desired flow rate (dashed plot 405).

At time t3, the inlet gas flow rate increases (plot 402), thereby increasing the desired process gas flow rate (dashed plot 405), while the desired process gas pressure (dashed plot 403) remains constant. In response to the increased inlet gas flow rate, the controller actuates the choke valve to a further open position (plot 408) to increase the process gas flow rate to a level that matches the higher inlet gas flow rate and actuates the turbine bypass valve to a further open position (plot 410) to increase an amount of gas flow bypassing the turbine to compensate for the increased inlet gas flow rate. For example, the controller may refer to a look-up table for the corresponding turbine bypass valve and choke valve positions that will produce the desired process gas pressure (dashed plot 403) and the increased desired process gas flow rate (dashed plot 405) for the increased inlet gas flow rate (plot 402). As a result, the process gas pressure (plot 404) is maintained at the desired process gas pressure (dashed plot 403) and the process gas flow rate (plot 406) is increased to the updated, increased desired flow rate (dashed plot 405).

In this way, a Brayton cycle turbocharger system for a gas separation system is provided for compressing a $CO_2$-containing process gas and outputting the process gas to a $CO_2$ capture system across a range of ambient and gas separation system operating conditions. The turbocharger system may include three stages (e.g., a low pressure turbocharger stage, a mid-pressure turbocharger stage, and a high-pressure turbocharger stage) such that a high pressure compression process is divided between two compression stages (e.g., the high pressure stage and the mid-pressure stage), thereby increasing an overall thermodynamic compression process by enabling a higher pressure process gas to be achieved for a same amount of input energy. As a result, a size of the system may be reduced, a flow rate of the process gas may be increased, and/or lower mechanical stress may be applied on the high pressure stage and the mid-pressure stage. Further, the system may include a choke valve coupled downstream of the high pressure stage compressor and upstream of a heat exchanger, downstream of where the process gas is output to the $CO_2$ capture system, to actively regulate a flow rate of the process gas. Further still, the system may include a turbine bypass valve coupled across a turbine of each stage to actively regulate a pressure of the process gas. As a result of adjusting the choke valve and the turbine bypass valves, the process gas pressure and flow rate may be optimized without changing the turbine hardware.

The technical effect of including three turbocharger stages in a Brayton cycle turbocharger system, with intercooling between each compression stage, is that a size of the system may be decreased while an overall thermodynamic efficiency of the compression process is increased and a reliability of the turbocharger system is increased.

The technical effect of including a choke valve between compression and heating stages of a Brayton cycle turbocharger system and a turbine bypass valve across one or more turbines of the Brayton cycle turbocharger system is that the turbocharger system may be actively controlled to output process gas at a desired pressure and flow rate across varying operating conditions.

In one example, a turbocharger system for use with a mining process gas capture system comprises: a heat exchanger positioned to receive hot inlet gas from a gas generating system via a first inlet; at least one low pressure turbocharger including a low pressure compressor rotationally coupled to a low pressure turbine and fluidly coupled to a first outlet of the heat exchanger, the low pressure compressor configured to receive cooled inlet gas discharged from the first outlet of the heat exchanger; at least one mid-pressure turbocharger including a mid-pressure compressor rotationally coupled to a mid-pressure turbine and fluidly coupled in series with the low pressure compressor, the mid-pressure compressor configured to receive low pressure compressed gas discharged by the low pressure compressor; and at least one high pressure turbocharger including a high pressure compressor rotationally coupled to a high pressure turbine and fluidly coupled in series with the mid-pressure compressor, the high pressure compressor configured to receive mid-pressure compressed gas discharged by the mid-pressure compressor and output high pressure compressed gas to the process gas capture system and a second inlet of the heat exchanger. In a first example of the system, the high pressure turbine is fluidly coupled to a second outlet of the heat exchanger and is configured to receive heated high pressure compressed gas discharged from the second outlet of the heat exchanger, wherein the mid-pressure turbine is fluidly coupled to the high pressure turbine in series and is configured to receive gas flow directly from an outlet of the high pressure turbine, and wherein the low pressure turbine is fluidly coupled to the mid-pressure turbine in series and is configured to receive gas flow directly from an outlet of the mid-pressure turbine. A second example of the system optionally includes the first example and further comprises a first turbine bypass valve coupled across the high pressure turbine and configured to control a first gas flow from an inlet of the high pressure turbine to the outlet of the high pressure turbine, the first gas flow bypassing the high pressure turbine without flowing through the high pressure turbine; a second turbine bypass valve coupled across the mid-pressure turbine and configured to control a second gas flow from an inlet of the mid-pressure turbine to the outlet of the mid-pressure turbine, the second gas flow bypassing the mid-pressure turbine without flowing through the mid-pressure turbine; and a third turbine bypass valve coupled across the low pressure turbine and configured to control a third gas flow from an inlet of the low pressure turbine to an outlet of the low pressure turbine, the third gas flow bypassing the low pressure turbine without flowing through the low pressure turbine. A third example of the system optionally includes one or both of the first and second examples and further comprises a choke valve coupled between an outlet of the high pressure compressor and the second inlet of the heat exchanger. In a fourth example of the system, which optionally includes one or more or each of the first through third examples, the high pressure compressed gas flows from the outlet of the high pressure compressor to the second inlet of the heat exchanger via a first flow path and to the carbon dioxide capture system via a second flow path that branches from the first flow path upstream of the choke valve, the choke valve arranged in the first flow path. A fifth example of the system optionally includes one or more or each of the first through fourth examples and further comprises one or more of a first turbine bypass valve coupled across the high pressure turbine, a second turbine bypass valve coupled across the mid-pressure turbine, and a third turbine bypass valve coupled across the low pressure turbine. A sixth example of the system optionally includes one or more or each of the first through fifth examples and further comprises a controller including instructions stored on memory, that when executed during operation of the system, cause the controller to: adjust a position of each of the choke valve and the one or more of the first turbine bypass valve, the second turbine bypass valve, and the third turbine bypass valve based on a desired mass flow rate of gas through the low pressure compressor, mid-pressure compressor, and high pressure compressor and pressure of the output high pressure compressed gas. In a seventh example of the system, which optionally includes one or more or each of the first through sixth examples, adjusting the position of each of the choke valve and the one or more of the first turbine bypass valve, the second turbine bypass valve, and the third turbine bypass valve includes first adjusting a position of the choke valve to achieve the desired mass flow rate and then, after adjusting the position of the choke valve, adjusting the position of the one or more of the first turbine bypass valve, the second turbine bypass valve, and the third turbine bypass valve to achieve the desired pressure. In an eighth example of the system, which optionally includes one or more or each of the first through seventh examples, a first intercooler is positioned in a third gas flow path between an outlet of the low pressure compressor and an inlet of the mid-pressure compressor, and a second intercooler is positioned in a fourth gas flow path between an outlet of the mid-pressure compressor and an inlet of the high pressure compressor.

An example method for a turbocharger system for use with a mining process gas capture system comprises: adjusting one or more turbine bypass valves and a choke valve of the turbocharger system based on a desired mass flow rate and a pressure of a process gas output by the turbocharger system to the mining process gas capture system, the turbocharger system including a low pressure turbocharger including a low pressure turbine configured to drive a low pressure compressor, a mid-pressure turbocharger including a mid-pressure turbine configured to drive a mid-pressure compressor, the mid-pressure compressor fluidly coupled downstream of the low pressure compressor, and a high pressure turbocharger including a high pressure turbine configured to drive a high pressure compressor, the high pressure compressor fluidly coupled downstream of the mid-pressure compressor, the one or more turbine bypass valves coupled across one or more of the low pressure turbine, the mid-pressure turbine, and the high pressure turbine, and the choke valve positioned downstream of an outlet of the high pressure compressor and upstream of a first inlet of a heat exchanger that is positioned to receive hot inlet gases from a gas generating system via a second inlet and discharge cooler inlet gases to the low pressure compressor, where the desired mass flow rate is a desired mass flow rate of gas entering and flowing through the low pressure compressor. In a first example of the method, adjusting the one or more turbine bypass valve and the choke valve includes simultaneously adjusting a position of each of the one or more turbine bypass valves and the choke valve to obtain the desired mass flow rate and desired pressure. In a second example of the method, which optionally includes the first example, the simultaneously adjusting includes adjusting the position of each of the one or more turbine bypass valves and the choke valve to positions between and including each of a fully open and fully closed position according to a look-up table, where the positions are the outputs and the inputs are boundary conditions of the gas generating system providing gases to the heat exchanger, the boundary conditions including one or more of an ambient temperature, a temperature of the hot inlet gases from the gas generating system, a pressure of the hot inlet gases from the gas generating system, and a flow rate of the hot inlet gases from the gas generating system. In a third example of the method, which optionally includes one or both of the first and second examples, adjusting the one or more turbine bypass valves and the choke valve includes decreasing an amount of opening of the one or more turbine bypass valves and/or decreasing an amount of opening of the choke valve to increase a pressure of the output process gas in response to an increase in the desired pressure of the output process gas. In a fourth example of the method, which optionally includes one or more or each of the first through third examples, adjusting the one or more turbine bypass valves and the choke valve includes decreasing an amount of opening of the choke valve and/or decreasing an amount of opening of the one or more turbine bypass valves to decrease a mass flow rate of the gas entering and flowing through the low pressure compressor in response to a decrease in the desired mass flow rate. A fifth example of the method optionally includes one or more or each of the first through fourth examples and further comprises cooling low pressure compressed gas output by the low pressure compressor prior to flowing the low pressure compressed gas to an inlet of the mid-pressure compressor and cooling mid-pressure compressed gas output by the mid-pressure compressor prior to flowing the mid-pressure compressed gas to the high pressure compressor. In a sixth example of the method, which optionally includes one or more or each of the first through fifth examples, the turbocharger system includes a first turbine bypass valve coupled across the high pressure turbine, a second turbine bypass valve coupled across the mid-pressure turbine, and a third turbine bypass valve coupled across the low pressure turbine and further comprising adjusting one or more of the first turbine bypass valve, the second turbine bypass valve, and the third turbine bypass valve and adjusting the choke valve in response to a change in the desired mass flow rate and/or desired pressure. In a seventh example of the method, which optionally includes one or more or each of the first through sixth examples, adjusting one or more of the first turbine bypass valve, the second turbine bypass valve, and the third turbine bypass valve and adjusting the choke valve in response to a change in the desired mass flow rate and/or desired pressure includes adjusting the choke valve to a further closed position than for the desired mass flow rate and then increasing an opening of one or more of the first turbine bypass valve, the second turbine bypass valve, and the third turbine bypass valve to achieve the desired mass flow rate.

An example system for use with a mining carbon dioxide capture system comprises: a heat exchanger positioned to receive hot inlet gas from a gas generating system via a first inlet; a low pressure turbocharger including a low pressure compressor and a low pressure turbine, the low pressure compressor fluidly coupled to a first outlet of the heat exchanger; a mid-pressure turbocharger including a mid-pressure compressor and a mid-pressure turbine, the mid-pressure compressor fluidly coupled in series with the low pressure compressor; a high pressure turbocharger including a high pressure compressor and a high pressure turbine, the high pressure compressor fluidly coupled in series with the mid-pressure compressor and fluidly coupled to a second inlet of the heat exchanger; at least one turbine bypass valve coupled across at least one of the low pressure turbine, the mid-pressure turbine, and the high pressure turbine; a choke valve coupled between an outlet of the high pressure compressor and the second inlet of the heat exchanger; and a controller including instructions stored on memory, that when executed during operation of the system, cause the controller to: adjust the choke valve and the at least one turbine bypass valve based on a desired mass flow rate of a process gas at an inlet to the system and a desired pressure of the process gas output by the high pressure compressor to the mining carbon dioxide capture system. A first example of the system further comprises a first turbine bypass valve coupled across the low pressure turbine, a second turbine bypass valve coupled across the mid-pressure turbine, and a third turbine bypass valve coupled across the high pressure turbine. In a second example of the system, which optionally includes the first example, the high pressure compressor outputs gas in a first flow path, the choke valve is coupled in the first flow path, and the process gas output by the high pressure compressor to the carbon dioxide capture system is output via second flow path that branches from the first flow path upstream of the choke valve.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by a control system including the controller in combination with the various sensors, actuators, and other system hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the controller, where the described actions are carried out by executing the instructions in a system including the various system hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A turbocharger system for use with a mining process gas capture system, the turbocharger system comprising:
    a heat exchanger positioned to receive hot inlet gas from a gas generating system via a first inlet;
    at least one low pressure turbocharger including a low pressure compressor rotationally coupled to a low pressure turbine and fluidly coupled to a first outlet of the heat exchanger, the low pressure compressor configured to receive cooled inlet gas discharged from the first outlet of the heat exchanger;
    at least one mid-pressure turbocharger including a mid-pressure compressor rotationally coupled to a mid-pressure turbine and fluidly coupled in series with the low pressure compressor, the mid-pressure compressor configured to receive low pressure compressed gas discharged by the low pressure compressor;
    at least one high pressure turbocharger including a high pressure compressor rotationally coupled to a high pressure turbine and fluidly coupled in series with the mid-pressure compressor, the high pressure compressor configured to receive mid-pressure compressed gas discharged by the mid-pressure compressor and output high pressure compressed gas to the mining process gas capture system and a second inlet of the heat exchanger; and
    a choke valve coupled between an outlet of the high pressure compressor and the second inlet of the heat exchanger.

2. The turbocharger system of claim 1, wherein the high pressure turbine is fluidly coupled to a second outlet of the heat exchanger and is configured to receive heated high pressure compressed gas discharged from the second outlet of the heat exchanger, wherein the mid-pressure turbine is fluidly coupled to the high pressure turbine in series and is configured to receive gas flow directly from an outlet of the high pressure turbine, and wherein the low pressure turbine is fluidly coupled to the mid-pressure turbine in series and is configured to receive gas flow directly from an outlet of the mid-pressure turbine.

3. The turbocharger system of claim 2, further comprising:
    a first turbine bypass valve coupled across the high pressure turbine and configured to control a first gas flow from an inlet of the high pressure turbine to the outlet of the high pressure turbine, the first gas flow bypassing the high pressure turbine without flowing through the high pressure turbine;
    a second turbine bypass valve coupled across the mid-pressure turbine and configured to control a second gas flow from an inlet of the mid-pressure turbine to the outlet of the mid-pressure turbine, the second gas flow bypassing the mid-pressure turbine without flowing through the mid-pressure turbine; and
    a third turbine bypass valve coupled across the low pressure turbine and configured to control a third gas flow from an inlet of the low pressure turbine to an outlet of the low pressure turbine, the third gas flow bypassing the low pressure turbine without flowing through the low pressure turbine.

4. The turbocharger system of claim 1, wherein the high pressure compressed gas flows from the outlet of the high pressure compressor to the second inlet of the heat exchanger via a first flow path and to the mining process gas capture system via a second flow path that branches from the first flow path upstream of the choke valve, the choke valve arranged in the first flow path.

5. The turbocharger system of claim 1, further comprising one or more of a first turbine bypass valve coupled across the high pressure turbine, a second turbine bypass valve coupled across the mid-pressure turbine, and a third turbine bypass valve coupled across the low pressure turbine.

6. The turbocharger system of claim 5, further comprising a controller including instructions stored on memory, that when executed during operation of the turbocharger system, cause the controller to: adjust a position of each of the choke valve and the one or more of the first turbine bypass valve, the second turbine bypass valve, and the third turbine bypass valve based on a desired mass flow rate of gas through the low pressure compressor, the mid-pressure compressor, and the high pressure compressor and a desired pressure of the high pressure compressed gas.

7. The turbocharger system of claim 6, wherein adjusting the position of each of the choke valve and the one or more of the first turbine bypass valve, the second turbine bypass valve, and the third turbine bypass valve includes first adjusting the position of the choke valve to achieve the desired mass flow rate and then, after adjusting the position of the choke valve, adjusting the position of the one or more of the first turbine bypass valve, the second turbine bypass valve, and the third turbine bypass valve to achieve the desired pressure.

8. The turbocharger system of claim 1, wherein a first intercooler is positioned in a first gas flow path between an outlet of the low pressure compressor and an inlet of the mid-pressure compressor, and a second intercooler is positioned in a second gas flow path between an outlet of the mid-pressure compressor and an inlet of the high pressure compressor.

9. A method for a turbocharger system for use with a mining process gas capture system, the method comprising:

adjusting, via electronic signals received from a controller, one or more turbine bypass valves and a choke valve of the turbocharger system based on electronic feedback signals received by the controller from pressure and mass flow sensors and further based on each of a desired mass flow rate and a desired pressure of a process gas output by the turbocharger system to the mining process gas capture system, the turbocharger system including a low pressure turbocharger including a low pressure turbine configured to drive a low pressure compressor, a mid-pressure turbocharger including a mid-pressure turbine configured to drive a mid-pressure compressor, the mid-pressure compressor fluidly coupled downstream of the low pressure compressor, and a high pressure turbocharger including a high pressure turbine configured to drive a high pressure compressor, the high pressure compressor fluidly coupled downstream of the mid-pressure compressor, the one or more turbine bypass valves coupled across one or more of the low pressure turbine, the mid-pressure turbine, and the high pressure turbine, and the choke valve positioned downstream of an outlet of the high pressure compressor and upstream of a first inlet of a heat exchanger that is positioned to receive hot inlet gases from a gas generating system via a second inlet and discharge cooler inlet gases to the low pressure compressor, where the desired mass flow rate is a desired mass flow rate of gas entering and flowing through the low pressure compressor.

10. The method of claim 9, wherein adjusting the one or more turbine bypass valves and the choke valve includes simultaneously adjusting a position of each of the one or more turbine bypass valves and the choke valve to obtain the desired mass flow rate and the desired pressure.

11. The method of claim 10, wherein the simultaneously adjusting includes adjusting the position of each of the one or more turbine bypass valves and the choke valve to positions between and including each of a fully open and fully closed position according to a look-up table, where the positions are outputs and where inputs are boundary conditions of the gas generating system providing gases to the heat exchanger, the boundary conditions including one or more of an ambient temperature, a temperature of the hot inlet gases from the gas generating system, a pressure of the hot inlet gases from the gas generating system, and a flow rate of the hot inlet gases from the gas generating system.

12. The method of claim 9, wherein adjusting the one or more turbine bypass valves and the choke valve includes decreasing an amount of opening of the one or more turbine bypass valves and/or decreasing an amount of opening of the choke valve to increase a pressure of the process gas in response to an increase in the desired pressure of the process gas.

13. The method of claim 9, wherein adjusting the one or more turbine bypass valves and the choke valve includes decreasing an amount of opening of the choke valve and/or decreasing an amount of opening of the one or more turbine bypass valves to decrease a mass flow rate of the gas entering and flowing through the low pressure compressor in response to a decrease in the desired mass flow rate.

14. The method of claim 9, further comprising cooling low pressure compressed gas output by the low pressure compressor prior to flowing the low pressure compressed gas to an inlet of the mid-pressure compressor and cooling mid-pressure compressed gas output by the mid-pressure compressor prior to flowing the mid-pressure compressed gas to the high pressure compressor.

15. The method of claim 9, wherein the turbocharger system includes a first turbine bypass valve coupled across the high pressure turbine, a second turbine bypass valve coupled across the mid-pressure turbine, and a third turbine bypass valve coupled across the low pressure turbine and further comprising adjusting one or more of the first turbine bypass valve, the second turbine bypass valve, and the third turbine bypass valve and adjusting the choke valve in response to a change in the desired mass flow rate and/or the desired pressure.

16. The method of claim 15, wherein adjusting one or more of the first turbine bypass valve, the second turbine bypass valve, and the third turbine bypass valve and adjusting the choke valve in response to the change in the desired mass flow rate and/or the desired pressure includes adjusting the choke valve to a further closed position than for the desired mass flow rate and then increasing an opening of one or more of the first turbine bypass valve, the second turbine bypass valve, and the third turbine bypass valve to achieve the desired mass flow rate.

17. A system for use with a mining carbon dioxide capture system, the system comprising:

a heat exchanger positioned to receive hot inlet gas from a gas generating system via a first inlet;

a low pressure turbocharger including a low pressure compressor and a low pressure turbine, the low pressure compressor fluidly coupled to a first outlet of the heat exchanger;

a mid-pressure turbocharger including a mid-pressure compressor and a mid-pressure turbine, the mid-pressure compressor fluidly coupled in series with the low pressure compressor;

a high pressure turbocharger including a high pressure compressor and a high pressure turbine, the high pressure compressor fluidly coupled in series with the mid-pressure compressor and fluidly coupled to a second inlet of the heat exchanger;

at least one turbine bypass valve coupled across at least one of the low pressure turbine, the mid-pressure turbine, and the high pressure turbine;

a choke valve coupled between an outlet of the high pressure compressor and the second inlet of the heat exchanger; and a controller including instructions stored on memory, that when executed during operation of the system, cause the controller to:

adjust the choke valve and the at least one turbine bypass valve based on a desired mass flow rate of a process gas at an inlet to the system and a desired pressure of the process gas output by the high pressure compressor to the mining carbon dioxide capture system.

18. The system of claim 17, further comprising a first turbine bypass valve coupled across the low pressure turbine, a second turbine bypass valve coupled across the mid-pressure turbine, and a third turbine bypass valve coupled across the high pressure turbine.

19. The system of claim 17, wherein the high pressure compressor outputs gas in a first flow path, the choke valve is coupled in the first flow path, and the process gas output by the high pressure compressor to the mining carbon dioxide capture system is output via second flow path that branches from the first flow path upstream of the choke valve.

20. The turbocharger system of claim 2, wherein the high pressure turbine receives the heated high pressure compressed gas directly from the second outlet of the heat exchanger.

* * * * *